United States Patent
Eklund

(10) Patent No.: US 10,821,480 B2
(45) Date of Patent: Nov. 3, 2020

(54) BRUSH HEAD AND METHOD OF OPERATING THE BRUSH HEAD

(71) Applicant: Fosieborg AB, Malmö (SE)

(72) Inventor: Bertil Eklund, Malmö (SE)

(73) Assignee: FOSIEBORG AB, Malmö (SE)

( * ) Notice: Subject to any disclaimer, the term of this patent is extended or adjusted under 35 U.S.C. 154(b) by 128 days.

(21) Appl. No.: 16/069,570

(22) PCT Filed: Jan. 12, 2017

(86) PCT No.: PCT/SE2017/050028
§ 371 (c)(1),
(2) Date: Jul. 12, 2018

(87) PCT Pub. No.: WO2017/123146
PCT Pub. Date: Jul. 20, 2017

(65) Prior Publication Data
US 2019/0030572 A1    Jan. 31, 2019

(30) Foreign Application Priority Data

Jan. 14, 2016 (SE) ...................... 1650037

(51) Int. Cl.
*B08B 1/00* (2006.01)
*A46B 5/00* (2006.01)
(Continued)

(52) U.S. Cl.
CPC ............ *B08B 1/002* (2013.01); *A46B 5/0095* (2013.01); *A46B 9/028* (2013.01); *A46B 9/04* (2013.01);
(Continued)

(58) Field of Classification Search
CPC ......... B08B 1/002; B08B 1/04; A46B 5/0095; A46B 9/028; A46B 9/04; A46B 13/02;
(Continued)

(56) References Cited

U.S. PATENT DOCUMENTS

| 2,582,552 | A | * | 1/1952 | Marco | ...................... A46B 9/04 |
| | | | | | 15/167.1 |
| 4,845,795 | A | | 7/1989 | Crawford et al. | |
| 5,070,567 | A | | 12/1991 | Holland | |
| 5,987,691 | A | * | 11/1999 | Jurt | ........................ A46D 1/023 |
| | | | | | 15/167.1 |

(Continued)

FOREIGN PATENT DOCUMENTS

| WO | 02/19942 A1 | 3/2002 |
| WO | 2015024784 A1 | 2/2015 |

OTHER PUBLICATIONS

International Type Search Report for corresponding Swedish Application No. 1650037-3, dated Aug. 29, 2016, 9 pages.
(Continued)

*Primary Examiner* — Shay Karls
(74) *Attorney, Agent, or Firm* — Tucker Ellis LLP

(57) ABSTRACT

The invention relates to a brush head for an electric toothbrush comprising a brush head shaft (20) with two ends, one end (21) with a tuft plate (30) being oscillatable about its centre axis, and one end adapted for detachable connection to a handle of the electric toothbrush, wherein the oscillatable tuft plate comprises at least three tufts (40), each tuft being non-rotatably attached to the tuft plate, wherein each tuft comprises a free end (41) and an end (42) fixedly attached to the oscillatable tuft plate.

14 Claims, 7 Drawing Sheets

(51) Int. Cl.
- *A46B 9/02* (2006.01)
- *A46B 9/04* (2006.01)
- *A61C 17/22* (2006.01)
- *A46B 13/02* (2006.01)
- *A46D 1/00* (2006.01)
- *A61C 17/34* (2006.01)
- *B08B 1/04* (2006.01)

(52) U.S. Cl.
CPC ............ *A46B 13/02* (2013.01); *A46D 1/0269* (2013.01); *A61C 17/222* (2013.01); *A61C 17/3436* (2013.01); *B08B 1/04* (2013.01); *A46B 2200/1066* (2013.01); *A61C 17/34* (2013.01)

(58) Field of Classification Search
CPC .. A46D 1/0269; A61C 17/222; A61C 17/3436
See application file for complete search history.

(56) References Cited

U.S. PATENT DOCUMENTS

| | | | |
|---|---|---|---|
| 6,363,565 | B1 * | 4/2002 | Paffrath ............... A46B 9/04 15/22.1 |
| D756,122 | S * | 5/2016 | Taylor ................ A61C 17/0202 D4/108 |
| 2004/0154112 | A1 | 8/2004 | Braun et al. |
| 2009/0049626 | A1 | 2/2009 | Eliav et al. |
| 2011/0099739 | A1 | 5/2011 | Whillock |
| 2011/0239391 | A1 | 10/2011 | Driesen et al. |
| 2014/0143962 | A1 | 5/2014 | Mok et al. |

OTHER PUBLICATIONS

International Preliminary Report on Patentability from corresponding International Patent Application No. PCT/SE2017/050028, dated May 30, 2018.

* cited by examiner

BRUSH HEAD AND METHOD OF OPERATING THE BRUSH HEAD

TECHNICAL FIELD

The invention relates to oral hygiene devices, in particular a device for dental cleaning by means of mono filaments, more in particular, the present invention relates to a brush head adapted for detachable connection to a handle of the electric toothbrush and a method for operating the brush head. The brush head comprises a tuft plate being oscillatable about its centre axis, which tuft plate further comprises at least three tufts made-up of mono filaments.

BACKGROUND ART

The first known bristle tooth brush dates back to ancient times, thereafter the bristle technology has developed into electrical toothbrushes where the brush head rotates or oscillates automatically to provide the desired tooth brushing. Some electrical toothbrushes comprise tufts on the rotatable or oscillatable brush head that are rotated individually in relation to each other and the brush head. The typical prior art brush heads for electrical toothbrushes are associated with a number of shortcomings.

In general, prior art brush heads of electrical toothbrushes mainly brushes the most exposed tooth areas, such as the main front and back surfaces of the teeth. The brush head of prior art electrical tooth brushes typically has a design inspired by the design of brush heads of manual tooth brushes that is not optimised for the oscillating movement of the electric ones.

Electric toothbrushes on the market usually have a number of 25-30 mono filament tufts, each with a diameter of about 1.5 mm at holder on a circular or elliptic holder/tuft plate. The tuft plate is positioned at a shaft fixed to the brush head. The tuft plate is commonly connected to a mechanism generating rotation thereof. The mechanism is usually powered by an electric motor that commonly is operatively arranged in the handle of the electric tooth brush. The electric motor is commonly driven by a rechargeable battery.

For existing electric toothbrushes the models with oscillating rotation of +/-30 degrees approximately, generally have the best cleaning effect. The oscillating rotating brush head has an average movement of about 75 cm/s at 5000 periods/minute, this compared to a manual toothbrush that has an average movement of about 5 cm/s.

Brush heads for electrical toothbrushes are also commonly small in size in comparison with manual toothbrushes and it follows that the brush head also generally comprises a smaller total number of tufts than the manual ones but comprises substantially the same number of tufts per area unit as the manual ones.

One known electric toothbrush is found in U.S. Pat. No. 5,070,567 disclosing a brush head with eleven individually rotatable tufts that are rotatable in relation to each other and the brush head. The rotation of each tuft is accomplished by gear mechanisms at each tuft.

SUMMARY OF THE INVENTION

It is an object of the present invention to provide a brush head which achieves increased access to and very good cleaning effect of the areas between the teeth, i.e. the interdental spaces, but also the transition area between gum and tooth, in particular along the edge of the gum.

It is an object of the present invention to provide a brush head and/or tuft plate minimizing unnecessary abrasion of the enamel of the teeth. Prior art electric tooth brushes brush constantly against the full/whole outer surface/face/crown of the tooth, resulting in unnecessary abrasion on such parts that generally do not need much brushing or any brushing at all due to natural abrasion/cleaning, e.g. while eating or from the internal tissues of the cheek.

It is an object of the present invention to provide a brush head and/or tuft plate with capacity to hold sufficient amounts of toothpaste, and also to provide an enhanced tooth paste dispensing and/or portioning function.

It is a further object of the present invention to provide a brush head comprising a bristle/tuft plate which in turn holds at least three or between three to five, preferably four tufts of a design which optimises the area of effective teeth brushing surface of the brush head by optimising the number of tips of mono filaments of the tuft which are in contact with the teeth during brushing and while the tufts are deformed/bent such that more of each tuft is kept in engagement with the teeth as compared to prior art brush heads.

It is a yet further object of the present invention to provide a brush head comprising a bristle, tuft, and/or tuft plate which in turn holds at least three or between three to five, preferably four tufts of a design which optimizes the ratio between beneficial brushing and cleaning and unnecessary abrasion of the teeth. Moreover, tooth areas more susceptible to plaque and/or more difficult to clean are more efficiently pinpointed and reached and thereby cleaned in a more optimized way in accordance with the invention.

It is a yet further object of the present invention to provide a brush head comprising a oscillatable or rotatable bristle/tuft plate, which in turn holds at least three or four tufts and at most five tufts of a design, which optimizes the ratio between beneficial brushing and cleaning and unnecessary abrasion of teeth. Each individual tuft is stationary, i.e. non-rotatably attached to the oscillatable/rotatable tuft plate making powering of the tuft plate oscillation/rotation simple and efficient. When rotating or oscillating the tuft plate, all of its tufts rotate with or follow it and each other as a synchronized group. By using fixed tufts on an oscillatable or rotatable tuft plate of a brush head for an electric toothbrush, any movable mechanism for each individual tuft is eliminated optimizing the number of movable parts simplifying structure and build-up of the brush head. This makes the brush head cheaper and easier to assemble and manufacture. This enhances its durability and useful life.

These objects are achieved by means of a brush head as claimed in the independent claims, preferred variants thereof being defined in the associated dependent claims.

The above and further objects are achieved by a brush head for an electric toothbrush comprising a brush head shaft with two ends, one end with a tuft plate being oscillatable about its centre axis, and one end adapted for detachable connection to the electric toothbrush, wherein the oscillatable tuft plate comprises at least three tufts, each tuft being non-rotatably attached to the tuft plate, wherein each tuft comprises a free end and an end fixedly attached to the oscillatable tuft plate, wherein each tuft of the tufts comprises mono filaments of varying length, and the oscillatable tuft plate comprises between three and five tufts, and that each tuft has a diameter in the range of about 3-4 mm. The tuft plate comprises between three to five tufts or four tufts or exactly four tufts arranged thereon.

The above and further objects are achieved by a brush head for an electric toothbrush comprising a brush head shaft with two ends, one end with a tuft plate oscillatable about its centre axis, and one end adapted for detachable connection to the electric toothbrush, wherein the oscillatable tuft plate of the brush head comprises at least three tufts, each tuft being non-rotatably attached to the tuft plate, wherein between three to five tufts are arranged on the tuft plate, each tuft comprising mono filaments of varying length and having a diameter in the range of about 3-4 mm, which tufts are arranged on the tuft plate symmetrically along a periphery of the tuft plate at a distance from the centre axis of the tuft plate, such that a space, which is devoid of tufts, is defined by the tufts at the centre of the tuft plate. The tuft plate has between three to five tufts or exactly four tufts arranged thereon.

The above and further objects are achieved by a brush head for an electric toothbrush comprising a brush head shaft with two ends, one end with a tuft plate being oscillatable about its centre axis, and one end adapted for detachable connection to a handle of the electric toothbrush. This makes the brush head exchangeable and configured to complement the electric toothbrush to enable teeth brushing after attachment to the tooth brush handle.

Further objects and features of the present invention will appear from the following definitions of aspects/examples of the invention.

According to some aspects, each tuft protrudes perpendicularly out from the tuft plate and/or perpendicularly to a longitudinal direction of the brush head shaft and/or perpendicularly to a longitudinal direction of the brush handle.

According to one further aspect, each tuft is arranged equidistant in relation to every other tuft along a periphery of the tuft plate. According to a further aspect, the tufts are arranged in equilateral formation along a periphery of the tuft plate. According to one further aspect, the tufts are arranged in uniform formation along a periphery of the tuft plate. According to a further aspect, the tufts are arranged equidistant to each other along a periphery of the tuft plate. According to another aspect, each tuft is arranged at a distance from the centre axis of the tuft plate. According to yet another aspect, each tuft is arranged at a distance of between 2-8 mm, or between 3.5-6.5 mm, or between 2-4 mm from the centre axis of the tuft plate. According to still another aspect, the distance is adapted to define a tooth paste dispensing space/tooth receiving space in the centre of the tuft plate, wherein the space is about 20-60 mm² and/or constitutes about 15-40%, or about 15-30% of the surface of the tuft plate on which the tufts are arranged. According to yet another aspect, the varying length of the mono filaments is configured to create a teeth brushing surface of the at least one tuft having a rotational symmetrical cambered outline, e.g. rounded.

According to still a further aspect, the varying length of the mono filaments is configured to create a teeth brushing surface comprising a protruding zone of filaments with increasing lengths towards the centre of the tuft. According to one further aspect, the varying length of the mono filaments is configured to create a supporting zone of filaments with decreasing lengths towards the periphery of the tuft. According to yet a further aspect, the varying length of the mono filaments is adapted to create a teeth brushing surface of the free tuft end comprising a supporting zone of shorter filaments configured to encircle the protruding zone of longer filaments.

According to further aspects, at least three or four or each/all tufts have a diameter in the range of about 2.5-4.5 mm, or in the range of about 3-4 mm, or about 3.5 mm, or about or exactly 4 mm or preferably about 3.5 mm. The diameter is at the tuft end fixedly or stationary or non-rotatably attached to the tuft plate. The diameter of the free tuft end is larger.

According to further aspects, the ratio of length between the longest and the shortest of the mono filaments is between about 60-90%, or between about 75-85% or about 80%.

According to further aspects, the tuft plate comprises at least four or at least three to six tufts, or three to five tufts, or four to five tufts or between four to five tufts or four tufts or exactly four tufts. According to further aspects, each mono filament has a thickness less than about 0.13 mm, or less than 0.11 mm or between 0.102 mm and 0.076 mm.

According to other aspects, the density of mono filaments at the end of the tuft attached to the tuft plate is at least 47, or between about 50-60, or between about 53 to 57, or between 55 to 56 mono filaments/mm², or preferred about 47 to 57 or preferably 50 to 55 or about 52 to 54 mono filaments/mm².

According to a still further aspect, the varying length of the mono filaments is adapted to increase the number of tips of the mono filaments at the free end of each tuft contacting a tooth in a bent state of the tuft/mono filaments.

The above and further objects are achieved by a brush head for an electric toothbrush comprising a brush head shaft with two ends, one end with a tuft plate oscillatable about its centre axis, and one end adapted for detachable connection to a handle of the electric toothbrush, wherein the oscillatable tuft plate of the brush head comprises at least three tufts, each tuft being non-rotatably attached to the tuft plate, wherein between three to five tufts or four tufts or exactly four tufts are arranged on the tuft plate, each tuft comprising mono filaments of varying length and having a diameter in the range of about 3-4 mm, which tufts are arranged on the tuft plate symmetrically along a periphery of the tuft plate at a distance from the centre axis of the tuft plate, such that a space, which is devoid of tufts, is defined by the tufts at the centre of the tuft plate.

According to further aspects, the brush head features that the distance is between about 2-8 mm, or between about 3.5-6.5 mm, or between about 2-4 mm, or at least 2.5 mm from the centre axis of the tuft plate.

In some aspects, the brush head according to any of the above aspects features that at least three or each and/or all tufts may comprise mono filaments of varying length.

In one aspect, the brush head according to any of the aspects features that the tufts may be symmetrically arranged along a periphery of the oscillatable tuft plate.

In one aspect, the brush head according to any of the aspects features that the inner periphery of each tuft is arranged at a distance of 1-6 mm or 2-4 mm from the centre of the oscillatable tuft plate.

In one aspect, the brush head according to any of the aspects features that the tufts are symmetrically arranged along a periphery of the oscillatable tuft plate at a distance of 2-4 mm or at a distance of 2-3 mm or at a distance of 2.5 mm from the centre of the tuft plate.

In some aspects, the brush head according to any of the aspects features mono filaments with a thickness of between 0.07 mm to 0.13 mm, or about 0.076 mm and/or about 0.102 mm.

In further aspects, the brush head according to any of the aspects features that the varying length of the mono filaments is configured to create a teeth brushing surface of at least one tuft, the surface having a rotational symmetrical outline, preferably rounded, more preferred hemispherical outline, or even parabolic outline.

In some aspects, the brush head according to any of the aspects features that the teeth brushing surface of the at least one tuft of the oscillatable tuft plate has a radius of curvature which is progressively decreasing or increasing from the tuft periphery to the tuft centre.

In a further aspect, the brush head according to any of the aspects features that the varying length of the mono filaments is configured to create a brushing surface for the at least one tuft and in another aspect configured to create a brushing interface formed by a plurality of tufts. The brushing interface may be described as a three dimensional extrapolated surface defined by the contact points between mono filaments and tooth/teeth. Consequently, the shape of the brushing interface is subjected to change in response to a deformation of the tufts depending on the amount of force applied on the tuft plate by a user when brushing teeth. In one aspect, the brushing interface has a cup shaped hemispherical shape or a shape substantially corresponding to the shape of a tooth and wherein the interface comprises a non-contact or non-abrasive area in the centre and/or bottom centre which is devoid of tufts. The centre of the brushing interface may correspond to the centre of the tuft plate.

In one aspect, the brush head according to any of the aspects features that all tufts are arranged at a distance from the centre of the tuft plate creating a space devoid of tufts in the centre of the tuft plate. This space forms a non-contact or non-abrasive or non-brushing area of the brush head. This space provides the brush head and tuft plate with a cavity. This cavity is configured to receive a whole tooth, e.g. a smaller one, a corner of a tooth or part of a larger tooth enabling increased or facilitate further reach for mono filament tips of the tufts in areas beyond or past the part of the tooth being received by the cavity, such as areas between teeth, interdental space and/or the bottom/neck area of the teeth adjacent/at the gum, and/or the transition area between gum and tooth.

In a further aspect, the brush head according to any of the aspects features that the tuft plate comprises exactly four tufts.

In one aspect, the brush head according to any of the aspects features a density of mono filaments at the free end of at least one tuft between about 35 to 40 mono filaments/mm$^2$. This density varies during brushing as the tuft spreads its mono filaments during its movement and also varies in dependence to how long the brush head is/has been used and/or the force/pressure exerted by the user on the brush head.

The above objects are also achieved by means of a method of operating the brush head as claimed in the associated independent claim, preferred variants thereof being defined in the associated dependent claims.

The above and further objects are achieved by a method of operating a brush head for an electric toothbrush comprising a brush head shaft with two ends, one end with a tuft plate oscillatable about its centre axis, and one end adapted for detachable connection to a handle of the electric toothbrush, wherein the oscillatable tuft plate of the brush head comprises at least three tufts, each tuft being non-rotatably attached to the tuft plate, wherein the method comprises arranging between three and five tufts or four or exactly four tufts on the tuft plate, each tuft having a diameter in the range of about 3-4 mm and comprising mono filaments of varying length, and oscillation of the tuft plate about its centre axle such that each tuft arranged on the tuft plate makes an angular sweep having an arc length corresponding to an arc angle of at least 45°-90° (degrees) relative the centre axle, such that the arc angles of all the tufts equal a sum of minimum 230°-270° (degrees) and up to 360°-450° (degrees) maximum for every half period of the oscillation.

Further objects and features of the present invention will appear from the following detailed description of aspects/examples of the invention.

According to one aspect, the brush head according to any of the aspects features a tuft plate which is fixedly or detachably attached to the brush head shaft, for example by means of a snap-in mechanism.

According to further aspects, at least three or more or each and/or all tufts according to any of the aspects arranged on the brush head have a diameter of about or exactly 3-4 mm, or about or exactly 3.5 mm, or about or exactly 4 mm.

According to other aspects, the mono filaments according to any aspect are manufactured from one or more of the materials selected from the group consisting of polyamide 610, polyamide 612, polyethylene terephthalate (PET), polyolefines such as PP, PE and high density polyethylene (HHD), such as Dynema.

According to a further aspect, the invention relates to a method for operating a brush head with a tuft plate according to any of the aspects, the method comprises as the following step: oscillation of the tuft plate about its centre axle such that the angular sweep of each tuft arranged on the tuft plate, equals at least 90 degrees in each direction of oscillation and/or during half a period of oscillation.

According to yet another aspect, the invention relates to a method for operating a brush head with a tuft plate according to any of the aspects, the method comprises the following step: oscillation of the tuft plate about its centre axle such that the angular sweep of the centre of the tuft conducts a sweep corresponding to an arc angle of about 60 degrees of in each direction of oscillation and/or during half a period of oscillation.

According to still another aspect, the varying length of the mono filaments according to any of the aspects of the at least one tuft of the tuft plate may be configured to create a teeth brushing surface of the tuft comprising a protruding zone of filaments with increasing lengths towards the centre of the tuft and a supporting zone of filaments with decreasing lengths towards the periphery of the tuft, the supporting zone of shorter filaments encircling the protruding zone of longer filaments.

In a yet further aspect, the tufts according to any of the aspects which are arranged on the tuft plate may be arranged such that when oscillated around the centre axis/axle of the tuft plate, the resulting swept sector/arc length of each tuft is equal for each and/or all tufts during a period of oscillation.

In one aspect, all tufts have corresponding or same shape. Each tuft shape is substantially cylindrical with a rounded or circular cross-section. In another aspect, all tufts have corresponding or same size, i.e. dimension, length, and/or diameter. In still one aspect, all tufts have corresponding or same diameter at their ends, which ends are fixedly or stationary or non-rotatably attached to the tuft plate. All above aspects are combinable with each other.

DETAILED DESCRIPTION

The invention and aspects/examples of it are disclosed below with reference to FIGS. 1 to 9.

Figure 1:
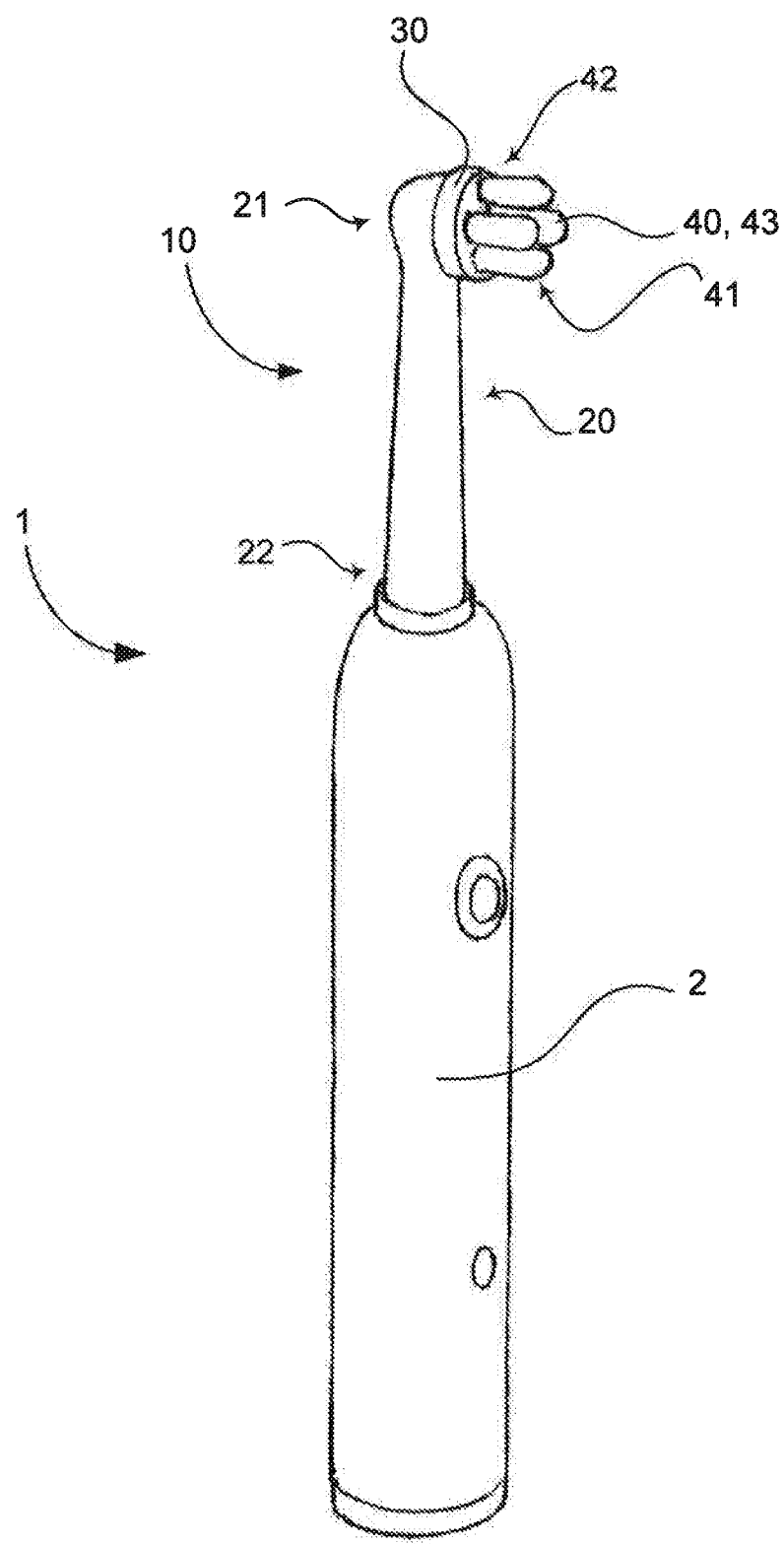
FIG. 1 is a perspective view of an electric toothbrush comprising a handle and a brush head with a tuft plate having tufts of mono filaments according to the invention.

Referring to FIG. 1, the invention concerns an electrical toothbrush 1 comprising a handle 2 and a brush head 10. The brush head 10 comprises a brush head shaft 20 having an free or upper end 21 and a lower end 22 and further comprises a tuft plate 30 oscillatable about its centre axis. The lower end 22 of the brush head shaft 20 is adapted for detachable and oscillation operative connection to the handle 2 of the electric tooth brush 1. The tuft plate 30 is e.g. fixedly or non-detachably attached or detachably/releasably attached to the upper end 21 of the brush head shaft 20 for example by means of a snap-in function. The brush head 10 is for example releasably attached to the handle 2 for example by sliding or threading it thereon, e.g. by use of a bayonet mount, by clamping or held by friction or by use of a snap-in function or other similar means. The tuft plate 30 features at least three tufts 40, but not more than six to eight tufts. The tufts 40 are in one example arranged with their respective longitudinal axis parallel to each other. The tufts 40 are in an example arranged substantially parallel to each other. In another example, the tufts 40 are arranged equidistant to each other on the tuft plate 30. Each tuft comprises a free or upper end 41 and an end 42 attached to the tuft plate. Each tuft comprises a plurality of mono filaments 43. The mono filaments 43 may after production spread somewhat, i.e. diverge from the longitudinal axis of the tuft 40, when extending in the direction from the end 42 for attachment towards the free end 41 of each tuft 40, thereby forming a slightly sloping outline of the tuft as illustrated in FIGS. 2, 4, 6A, 6B, 7 and 9. The attached end 42 of each of the tufts 40 may be cut or adapted in length in such manner that the attached end 42 attains a substantially cylindrical shape in the longitudinal direction with for example a sharply cut end or substantially flat end or a somewhat rounded end or marginally rounded or the like.

Each of the mono filaments 43 have outer surfaces/mantle surface 46 and two tips, one forming part of the attached tuft end 42 and one tip 47 forming part of the free tuft end 41. As the mono filaments 43 are bundled together they form a tuft 40 which outline is illustrated in FIGS. 1, 2, 4, 6A, 6B, 7 and 9. In this respect, also the tufts 40 have a mantle surface constituted by the plurality of mantle surfaces 46 of the mono filaments 43 arranged outmost/furthest from the centre of the tuft. The free end 41 of the tufts has a tip surface or teeth brushing surface 48, which shape is defined by the mono filament tips 47 and/or a varying length L, l, L' of the mono filaments 43, F, f making-up the whole tuft 40.

At least three tufts 40 or each or more or all tufts on the tuft plate 30 comprise monofilaments 43, F, f of varying length L, l, L'. The varying length L, l, L' is adapted, i.e. configured to attain various shapes of the free end 41 of the tuft or brushing surface 48 of the tuft. The teeth brushing surface is preferably rotational symmetrical around a longitudinal axis of the tuft. Exemplary embodiments are shown in FIGS. 1, 2, 4, 6A, 6B, 7 and 9 illustrating views of the outline of the tuft and the outline of the tufts free end 41 comprising the teeth brushing surface. The outline of the teeth brushing surface 48 may as a non-limiting example have a general cambered outline which is rotational symmetrical. This outline may as an example have a radius of curvature which increases towards the periphery of the tuft 40 as in FIG. 2, a parabolic shape or the shape of a part of a parable, alternatively the outline may in examples have the inverse or reverse shape comprising a pointy tip. In other examples, the outline of the tufts free end 41 has a substantially hemispherical or hemispherical shape or part of a hemisphere, as in FIGS. 2, 4, 6A, 6B, and 7.

Figure 3:
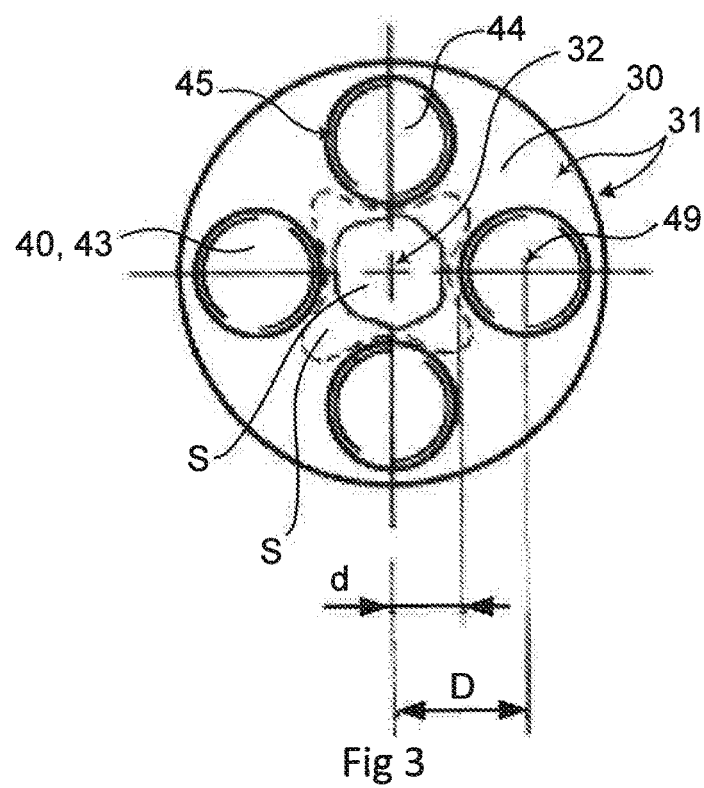
FIG. 3 is a top view of the tuft plate of FIGS. 1 and 2.
Figure 4:
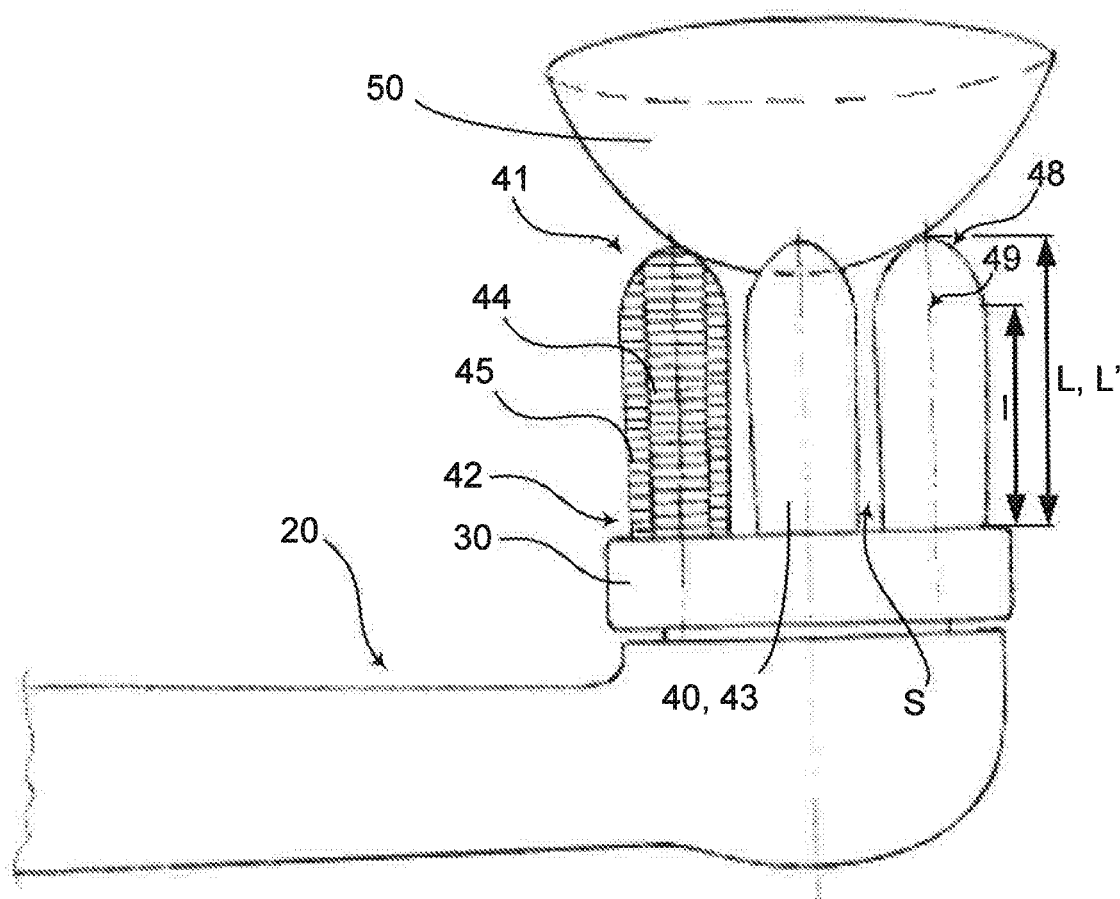
FIG. 4 is a side view of the free/upper end of the brush head of FIGS. 1-3.

Each tuft 40 may be described as comprising two theoretical zones 44, 45 of mono filaments F, f as illustrated in FIGS. 3 and 4. These zones 44, 45 are rotational symmetrical around the longitudinal axis/axle 49 of the tuft.

The more centrally arranged mono filaments 43, F of the tufts 40 may be referred to as constituting a first or inner zone or protruding zone 44. The protruding zone 44 thereby has a substantially cylindrical body. By way of example, if the free end 41 of the tuft 40 has a hemispherical shape, at least part of the rounded top or the hemisphere of the end 41 is defined by the protruding more centrally located zone 44.

Towards the periphery of the tuft 40, the protruding zone 44 is gradually transient towards a second or outer or supporting zone 45 comprised of mono filaments 43, f being shorter than the mono filaments 43, F of the protruding zone 44. Generally, in the supporting zone 45, the length l of the mono filaments 43 is also gradually transient towards shorter mono filaments f towards the periphery of the tuft. Due to this arrangement of mono filaments 43, F, f of varying length, creating the supporting zone 45 and the protruding zone 44, the shorter and more peripheral mono filaments f of the supporting zone 45 surrounds the protruding zone 44 having longer and more centrally located mono filaments F around the longitudinal axis 49 of the tuft 40 and provides support to the longer protruding mono filaments F of the protruding zone 44. Practically, the formation of the supporting zone 45 enables the protruding zone 44 to better withstand lengthwise deformation as the tuft or tufts 40 are pressed against/engage the teeth during brushing.

Seen from a radial perspective of the tuft 40, the supporting zone 45 is transient into the protruding zone 44 as the mono filaments 43, F towards the centre of the tuft gradually provide less support and become more protruding. The slope coefficient of the transition may vary and is dependent on the shape of the tufts free end 41 and/or the configuration of the varying length L, l, L' of the mono filaments 43, F, f in the two zones 44, 45. The boundary or border or line or changeover or crossing between the more peripheral supporting zone 45 with generally shorter mono filaments 43, f and the more central protruding zone 44 with generally longer mono filaments 43, F is indefinite or continuous. The transition from one zone 44 to the other zone 45 and vice versa may in principle be located anywhere between the centre axis of the tuft 40 and the enveloping mantle or outmost periphery of the tuft in the radial direction of the tuft 40 in FIGS. 2, 3, 4, 5, and 6. The transition from one zone 45 to the other zone 44 may also in principle exist from one or more individual and relatively long mono filament/-s 43, F to at least one other or more individual but relatively shorter mono filament/-s 43, f or vice versa. The supporting zone 45 has in principle an annular shape in the radial plane of the tuft 40. The protruding zone 44 has in principle a circular shape in the radial plane of the tuft 40.

The surface where the tufts 40 are in contact with the tooth/teeth and where the abrasion and/or brushing takes place may be referred to as a brushing interface 50 shown in FIG. 4. Practically the interface 50 takes and/or receives the shape of a tooth or teeth to which the inventive brush head 10 is applied. The shape of the interface 50 will depend on the amount of force applied by the user, thereby deforming the tufts along the surface of the teeth and/or gum to form the interface 50. For explanatory reasons/simplicity, interface 50 may be likened with a hemispheric cup-shape placed on top of the brush head 10 and resting with its convex surface on the free ends 41 of the tufts 40 and/or tips 47 of the mono filaments 43, F, f.

A further effect of the interplay between mono filaments 43, F, f of varying length L, l, L' to form the protruding zone 44 and the supporting zone 45 is that the diameter of each of the mono filaments 43, F, f is decreased and the number of mono filaments in a tuft thereby increased, resulting in a larger number of mono filament tips 47 in the interface 50 receiving or engaging a tooth, which conduct abrasion/cleaning in the interface, i.e. more mono filament tips 47 are in engagement with the tooth surface being brushed compared with prior art brush heads and tuft plates. This increases the mono filament density of the inventive tuft 40 as compared to prior art tufts.

Due to the protruding zone 44, enabled by the supporting zone 45, the tufts 40 reach between teeth and provide sufficient abrasion necessary to remove dirt particles, plaque and/or bacteria or sticky substances or the like without being deformed to such extent that they do not perform the desired brushing effect.

Figure 9:
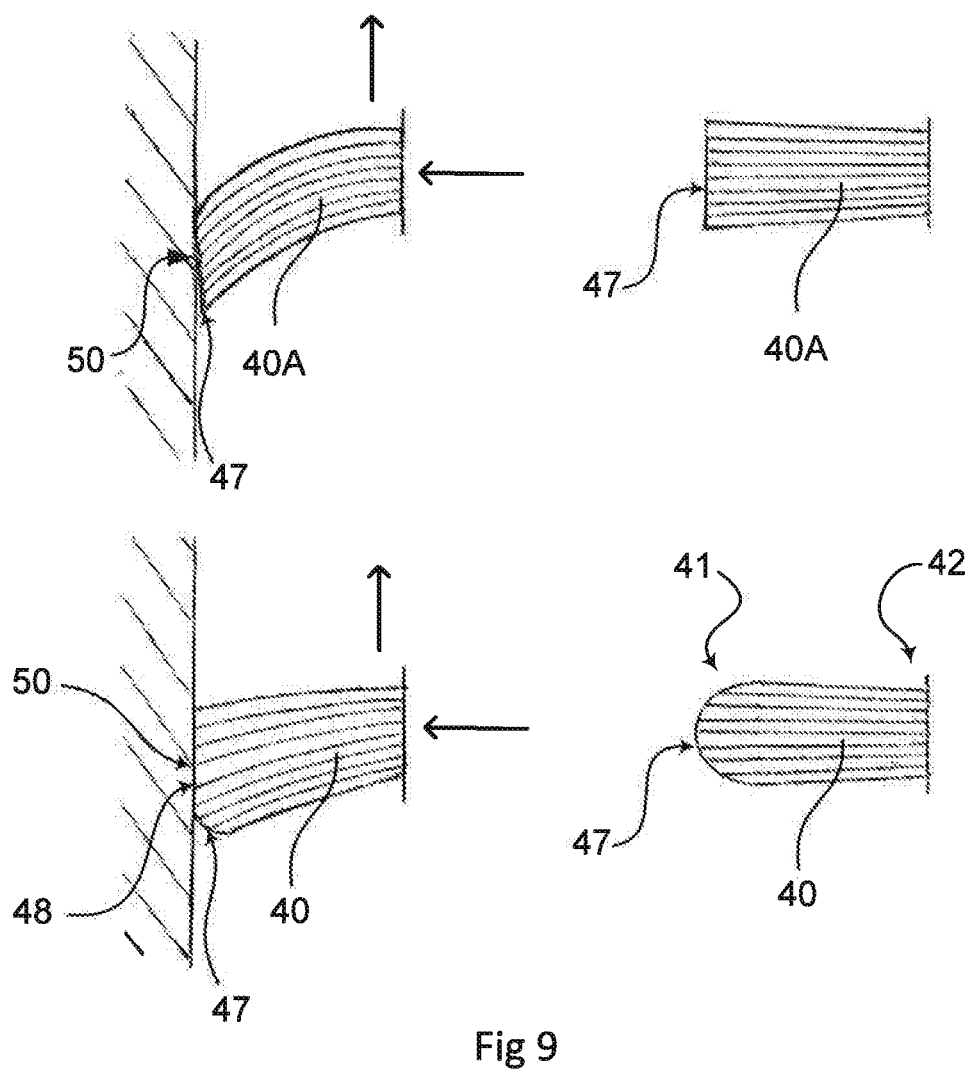
FIG. 9 is a schematic upper side view of a prior art tuft during brushing and a lower schematic side view of a tuft according to the invention during brushing.

The tips 47 of the mono filaments 43 have more effective abrasion properties than the stroking mantle surfaces 46. Therefore it is desirable to provide a tuft 40 which provides an interface 50 comprising as many tips 47 of mono filaments 43 as possible. Due to the smaller diameter and the varying length L, l, L' of the mono filaments F, f of the present invention, the tufts 40 will, when deformed/bent, provide significantly more tips 47 of mono filaments 43 in the interface 50 (see the interface 50 of FIG. 4 corresponding to an engagement and cleaning interface applied to a tooth during brushing shown in FIG. 7 and lower view in FIG. 9 for the dynamic and improved tuft end shape during the brushing) rather than mantle surfaces 46 of the mono filaments as is the case with prior art mono filaments 43 having the same length. Additionally, when a prior art tuft 40A having equally long mono filaments 43 shaping a clear cut and straight free end of the tuft, the mono filaments closest to the teeth surface which engage with the teeth surface tend to push the tips of the mono filaments overlaying the ones engaging the teeth surface away from the surface (see upper view in FIG. 9 showing the shape of a free end of a prior art tuft during brushing). A further shortcoming with prior art tuft plates, more in particular the tufts on such holders/tuft plates, is that the prior art tufts are designed, e.g. with straight cut ends as in the upper view of FIG. 9, such that, when deformed, they conduct a stroking movement over the teeth where virtually only the sides of the prior art mono filaments constituting the prior art tufts are in stroking contact with the tooth, rather than the tips of the mono filaments as done according to the brush head 10 and tufts 40 of the invention. The straight, horizontally and vertically extending arrows of FIG. 9 schematically show the direction of movement and/or the direction of oscillation/rotation of the brush head 10 and at least one of its tufts 40 and the direction of the force and/or pressure exerted onto these entities and the teeth by the user at brushing.

The tips 47 of the mono filaments 43 of the tufts 40 of the inventive brush head 10 have a improved brushing effect on the teeth since as a tip of a mono filament is moved/stroked across a surface, such as a teeth surface and feathers over plaque/a sticky substance/particle, which has adhered to a tooth or stuck on or between teeth, the tip 47 will push the plaque and/or substance and/or particle in the direction of the movement of the tip. Alternatively, the tip/-s 47 feather over the surface of the plaque/substance/particle and as it feathers back from the surface of the plaque/substance/particle to the surface of the tooth, achieves the inventive brushing effect, removing the plaque/substance/particle by a shovelling effect on the plaque and/or substance and/or particle as the tip feathers back and pushes the plaque to be cleaned in a direction substantially opposite the movement of the tip 47. The greater the stiffness of the feathering mono filament 43, F, f and/or the anvil-like function of the supporting zone 45 the greater is the shovelling effect. However, it is desirable to utilize as soft mono filaments 43 as possible to spare brushed surfaces, hence, the invention optimizes use of softer mono filaments 43 by means of an optimized relation between the number of mono filaments per tuft and the size of each tuft, e.g. the tuft diameter, that achieve improved springiness and/or elasticity and/or resilience due to the fact that the shorter and more peripherally arranged mono filaments f support the longer and more centrally located mono filaments F in each tuft 40 during brushing/sweeping. The invention is metaphorically explained as enabling an optimized cleaning effect vs. delicate abrasion by using more and softer mono filament tips of smaller size per surface area and tuft compared to fewer and stiffer mono filaments of the prior art, similar to a "fine" sand paper effect of the invention compared to a "course" sand paper effect, i.e. "rough grinding" effect in prior art. The supporting zone 45 assists the protruding zone 44 to withstand deformation and thereby the brushing effect is improved by the invention and its examples. By having a varying length of mono filaments 43, F, f in combination with many more such ones and at least three or between three to five or exactly four tufts 40 made up of these, there are a greater and optimized number of mono filament tips 47 in engagement with the tooth during the brushing and/or sweeping at any given moment during the sweep. The softness of mono filaments 43, F, f depends on the material and/or the thickness and/or the shape, e.g. the cross-sectional shape, and/or the length L, l, L' of each mono filament.

Figure 2:
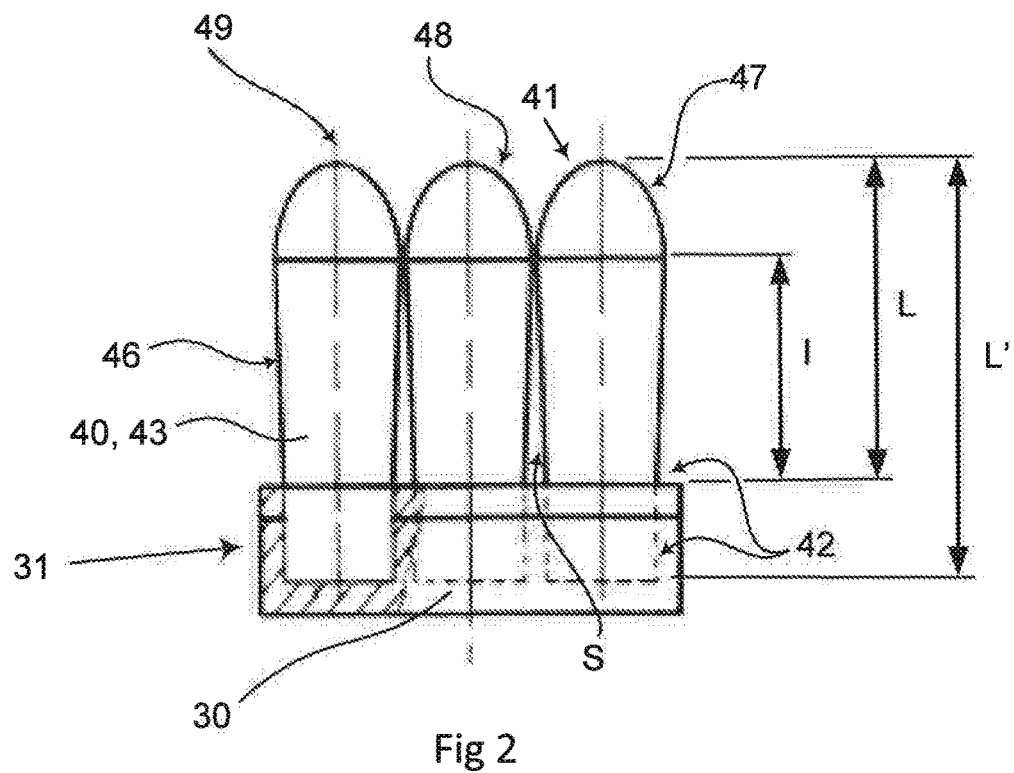
FIG. 2 is a cross-sectional view of the tuft plate of FIG. 1.

An exemplary embodiment shows the length of the mono filaments 43 in FIGS. 2 and 4 where the length of the mono filaments 43 is in the range of l-L or l-L'. In the embodiments shown in FIGS. 1 to 7 and 9, at least one, each, a plurality, many or all mono filaments 43 have a minimum free length l, which is the shortest length of the mono filaments 43, f constituting the supporting zone 45. In the embodiments shown in FIGS. 1 to 7 and 9, at least one, each, a plurality of or all mono filaments 43 may be the to have a maximum free length L, L', which is the longest length of the mono filaments F constituting the protruding zone 44. In the free end 41 of the tuft 40 the length of the mono filaments 43 may vary in the range between l and L/L'. The varying length difference L/L' minus l corresponds as an example to a radius of the rounded free end 41 of the tuft 40. The ratio between IA and/or VC may be in the range of 0.6 to 0.9 or 0.75 to 0.85 or preferably about 0.80 or equal to 0.80 measured from the upper surface or planar area and/or surface or edge of the tuft plate 30 (as indicated in FIG. 2).

In one aspect, the lengths L and l may vary, e.g. the longer length L is about or equal to between 10 to 15 mm, or between 11 to 14 mm or 12 to 13 mm, and the shorter length l is about or equal to between 5 to 8 mm or between 6 to 7 mm as measured from the tuft plate 30. In another aspect, the lengths L' and l may vary, e.g. the longer length L' is about or equal to between 10 to 15 mm, or between 11 to 14 mm or 12 to 13 mm, and the shorter length l is about or equal to between 5 to 8 mm or between 6 to 7 mm as measured from the tuft plate 30. In a further embodiment, the length of the mono filaments is less than l above or below. In a yet further embodiment, the mono filaments 43 are of equal length and holes in the tuft plate 30, in which the tufts 40 are attached, comprises cambered outlined bottoms having a shape corresponding to the described rounded free end 41 and/or teeth brushing surface 48 according to aspects of the invention. In one aspect, each and/or all of the tufts 40 are of identical shape and having the same value for the lengths l and L/L', i.e. the same variance in length for all their mono filaments 43 making up each tuft 40, e.g. the lengths L/L' and l of the mono filaments 43 in each tuft 40 varies between 7 to 13 mm or the lengths L' and l of the mono filaments 43 in each tuft 40 varies between 7 to 13 mm. The end 42 of each tuft 40 is adapted to be securely attached to the tuft plate 30 at a certain depth or height therein (see indications with dashed/broken lines in FIG. 2). The attachable end 42 may be introduced into and attached in a recess/depression/dent or a bottom/blind hole in the upper surface of the tuft plate 30 (see FIG. 2) or the tuft end 42 may be introduced into and attached in a through hole of the tuft plate (not shown). The depth of the recess/blind holes and length of a through hole in the tuft plate are sufficient for accomplishing a secure fastening of a certain sufficient length of the tuft end 42 on/in the tuft plate (FIG. 2 shows the height/depth difference between lengths l and L in relation to total length L'). Hence, the total length L' of each tuft 40 is probably larger than the maximum free length L of the tuft that extends from the surface of the tuft plate or is exposed/visible/accessible outside/externally of the tuft plate of FIG. 2. The tuft end 42 could also be directly attached to the upper surface of the tuft plate, in principle end-to-end where one end is the planar surface of the tuft plate 30 to form an end joint-like attachment of the end 42, as shown in FIG. 4, where the end 42 is as an example in principle flush with this surface, then total tuft length L' is equal to the free tuft length l, L. The total or maximum length L' of each tuft 40 would for example in principle correspond to the maximum free length L, if the mono filaments 43 were attached at different depths in the tuft plate 30, so that they protrude out of the tuft plate 30 with different lengths L, l even though all of the mono filaments 43 have the same absolute length L'. The total maximum length L' of the tuft 40, except for the thickness of a medium, such as melted tuft material if the tuft end 42 is heated to melt and then brought into contact with the surface of the tuft plate 30 until the melted tuft material is solidified fastening the tuft end 42 to the tuft plate, or adhesion or glue between the end surface of the tuft end 42 and the upper surface of the tuft plate facing the tuft end 42 for attachment thereof, is in principle close to or in principle the same as the maximum free length L, i.e. only somewhat shorter.

It has been contemplated that in some aspects, some of the tufts 40 have longer maximum length L, L' than the reminder of the tufts, for example the upper most and the lower most tuft in FIGS. 1 and 3 may have a longer maximum length L, L' than the remaining tufts in order to reach even further in between teeth.

Figure 5:
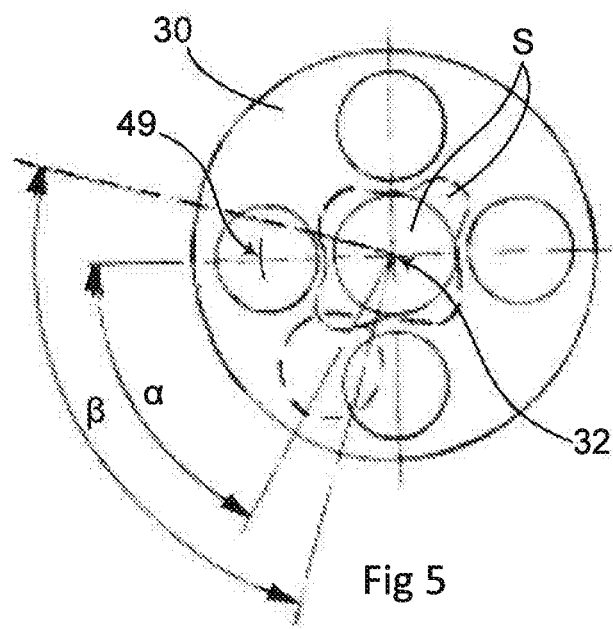
FIG. 5 is a top view of the tuft plate of FIGS. 1-4.
Figure 6A:
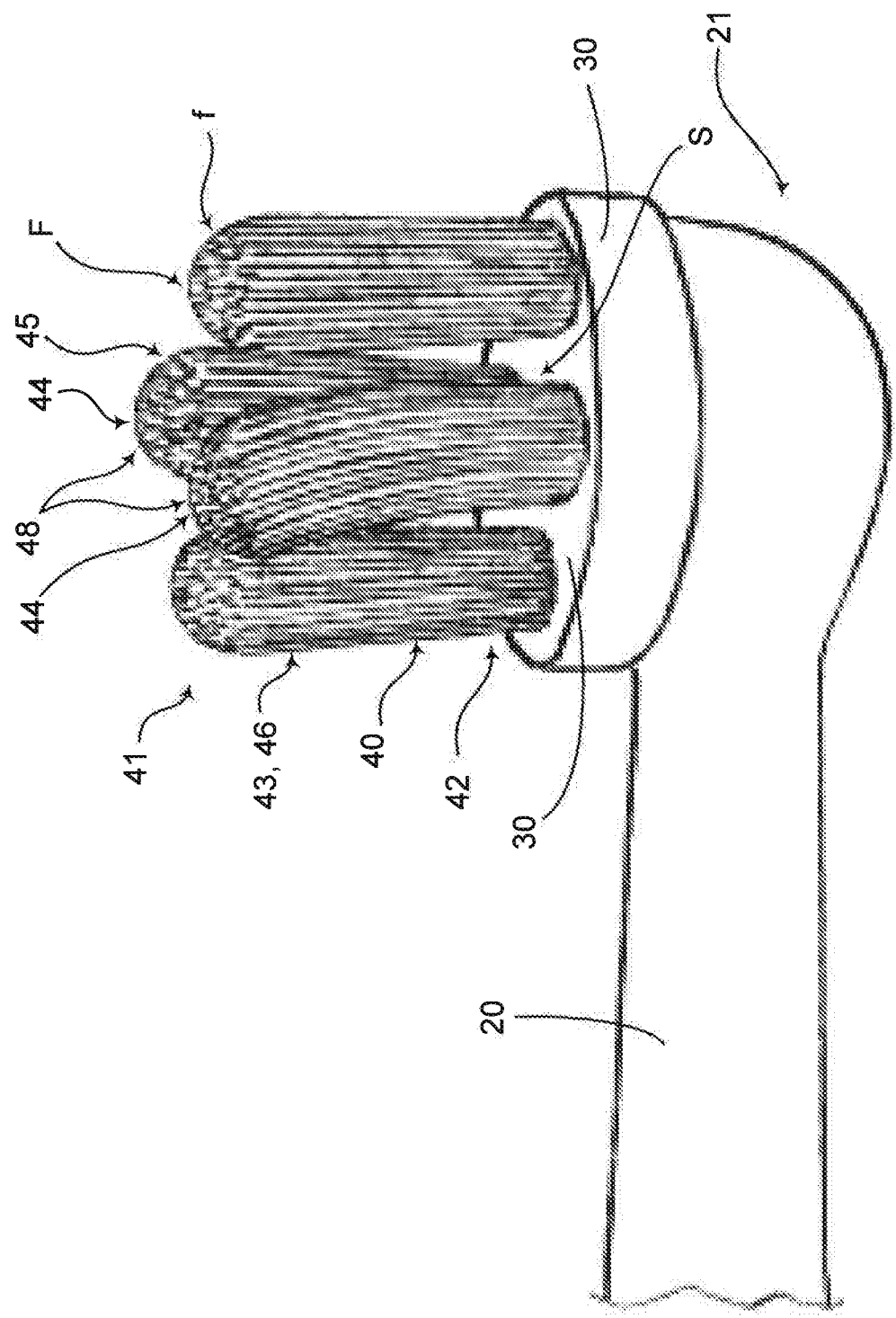
FIGS. 6A-B are perspective side views of the free/upper end of the brush head of FIGS. 1-5.
Figure 6B:
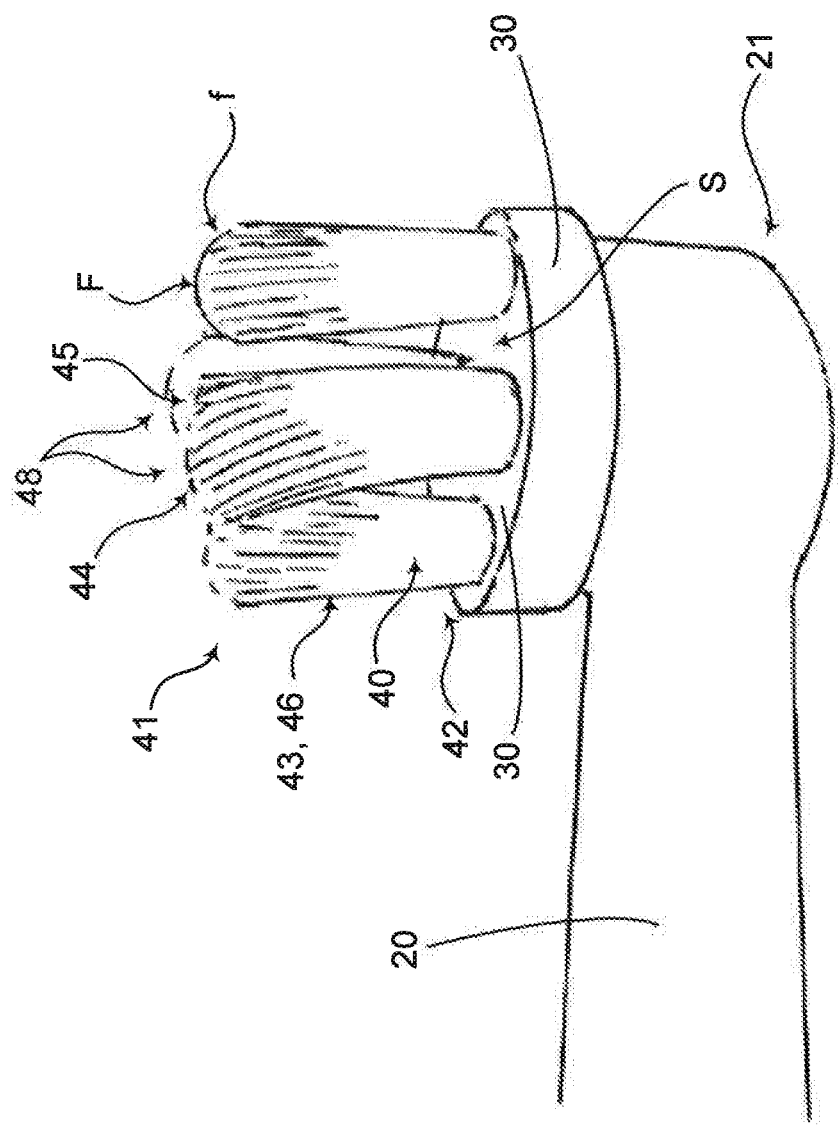

As illustrated e.g. in FIGS. 3 and 5, the tufts 40 are arranged equidistant to each other and symmetrically on the tuft plate 30. In one embodiment, the tuft plate comprises four tufts 40. Hence, when the electric toothbrush 1 is in an upright position as in the example of FIGS. 1 and 3, there may be an uppermost tuft 40, a lowermost tuft, a left and a right tuft which move in relation to each other during brushing. The inner periphery of the tufts 40 are in one or more embodiments arranged a distanced from the centre axle/axis 32 of the tuft plate 30. In one or more embodiments, the centre axis/axle 49 of the tufts 40 is arranged off-centre by a distance D from the centre axle/axis 32 of the tuft plate 30. The distances d and D are measured along a plane extending substantially in parallel with or in parallel with the extension plane of the tuft plate 30, i.e. the drawing or picture plane of FIGS. 3 and 5.

The tuft plate 30 comprises at least four to six tufts 40, or four to five tufts, or four tufts. The brush assembly 60 comprises the tuft plate 30 and at least three tufts, a plurality of tufts or exactly four tufts 40 according to aspects of the invention.

The diameter of tufts 40 is for example the same for all tufts but may differ. The diameter of tufts 40 differs as an example along at least a part of the length L', L, l or differs along a substantial part, e.g. along at least % of the length L', L, l, or differs along the whole length L', L, l of each individual tuft. The diameter of tufts is adjusted such that the protruding zone 44 attains sufficient support from the supporting zone 45. The tuft diameter is further adjusted such that the teeth and tooth paste receiving space S is defined/shaped in the centre of the tuft plate 30. The space S is devoid of tufts 40. In one or more embodiments, the diameter of the tuft or tufts 40 is in the range of about 2.5-4.5 mm, or about 3.5 mm or about 4 mm. These tuft diameters may be exact within the tolerances of the technical area as understood by the skilled person. The teeth receiving space S may have various shapes. The space S may be defined as a continuous space. The space S is adjacent or contiguous all the tufts 40. The space S is devoid of tufts 40 such that the tuft plate 30 may receive a tooth or a corner of a tooth in the area of the space S. The space S is only shown as two-dimensional areas in FIGS. 3 and 5 but space S has of course a height following the height of the inner mantle surface of the tufts extending in a direction substantially or mainly perpendicularly relative to the plane of the FIGS. 3 and 5, i.e. out of the plane of these Figs.

The space S further receives and facilitates the retaining of toothpaste since the space S enables a continuous homogenous volume of toothpaste to be retained and, during operation of the toothbrush 1, the volume of toothpaste is dispensed into the tufts 40 and/or the interface 50 and/or the mouth through gradual dissolving/dispensing during the operation of the electric toothbrush 1. In one or more embodiments, the teeth receiving space S is defined at least as a cylindrical or cubical or hexagonal volume space having a radius at least equal to distance d. Thereby, at least a volume of toothpaste of the radius d and length L, l of the mono filaments F, f may be retained by the tuft plate 30. In addition to the space S the toothpaste, when applied to the tuft plate, will migrate also in between the tufts 40 and/or between the mono filaments 43, further increasing the toothpaste volume holding capacity of the tuft plate. In further embodiments, the space S is defined as a cross-like space where the arms of the cross stretches from the centre of the tuft plate 30 towards and in some cases to the periphery 31 of the tuft plate 30. The arms of space S may have a thickness of at least 2 mm. The space S has a size/area corresponding to between about 10 to 40%; about 15 to 30%, about 20 to 30% or about 15 to 25% of the tuft plate area. The space S is about 20-40 mm² and/or the space S is about 20-40% of the surface area of the tuft plate 30.

Now referring to FIGS. 5 and 6, the invention relates to a method of operating the brush head 10 for an electric toothbrush 1 comprising the brush head shaft 20 with two ends, one end 21 with the tuft plate 30 oscillatable about its centre axis 32, and one end 22 adapted for detachable connection to the handle 2 of the electric toothbrush 1. The oscillatable tuft plate 30 of the brush head 10 comprises four tufts 40, wherein the tuft plate 30 oscillate about its centre axis/axle 32 such that each tuft arranged on the tuft plate makes an angular sweep over an arc length/sector corresponding to an arc angle β relative the centre axle 32, such that the arc angles of all the tufts 40 equal a sum of arc angles Σβ for every half period of the oscillation. The sum of arc angles Σβ is thereby the total angle over which the tufts 40 sweep. For example, if each tuft 40 conducts a sweep corresponding to a 90° arch angle β and there are four tufts on the tuft plate 30, then the sum of arc angles Σβ equals 360° (degrees). A full period of oscillation is when the tufts are revolved in one direction to an endpoint and subsequently revolved back to the starting point of the oscillation.

In one aspect of the invention, the centre 49 of each tuft 40 sweep over an arc length/sector corresponding to an arc angle α of approximately 60°. This results in the arc length/sector which is swept by the tangentially foremost and backmost peripheries of the tuft combined, sweep over an arc length corresponding to an arc angle β of approximately 90° due to the radius of the tufts 40 extending out from the centre 49 and/or due to the sideways flexing of the mono filaments 43, F, f when in engagement with teeth, thereby increasing the sector swept/arc length of the sweep during brushing.

In an aspect, the centre 49 of the tuft 40 on the tuft plate 30 makes an angular sweep over an arc length corresponding to arc angle α of at least 45°-60° or about 60° (degrees).

In yet an aspect, the swept sum of arc angles Σβ of all the tufts on the tuft plate is minimum 230-270 degrees and up to 360-450 degrees maximum for every half period of the oscillation, preferably Σβ equals about 360 degrees.

In one or more aspects, the method uses the brush head 10 for an electric toothbrush 1 comprising the brush head shaft 20 with two ends, one end 21 with the tuft plate 30 oscillatable about its centre axis 32, and one end 22 adapted for detachable connection to the handle 2 of the toothbrush. The oscillatable tuft plate 30 of the brush head comprises exactly four tufts 40. The tufts are arranged on the tuft plate 30 symmetrically along a periphery 31 of the tuft plate at a distance D, d from the centre of the tuft plate, such that the space S, which is devoid of tufts, is defined by the tufts at the centre of the tuft plate.

Figure 7:
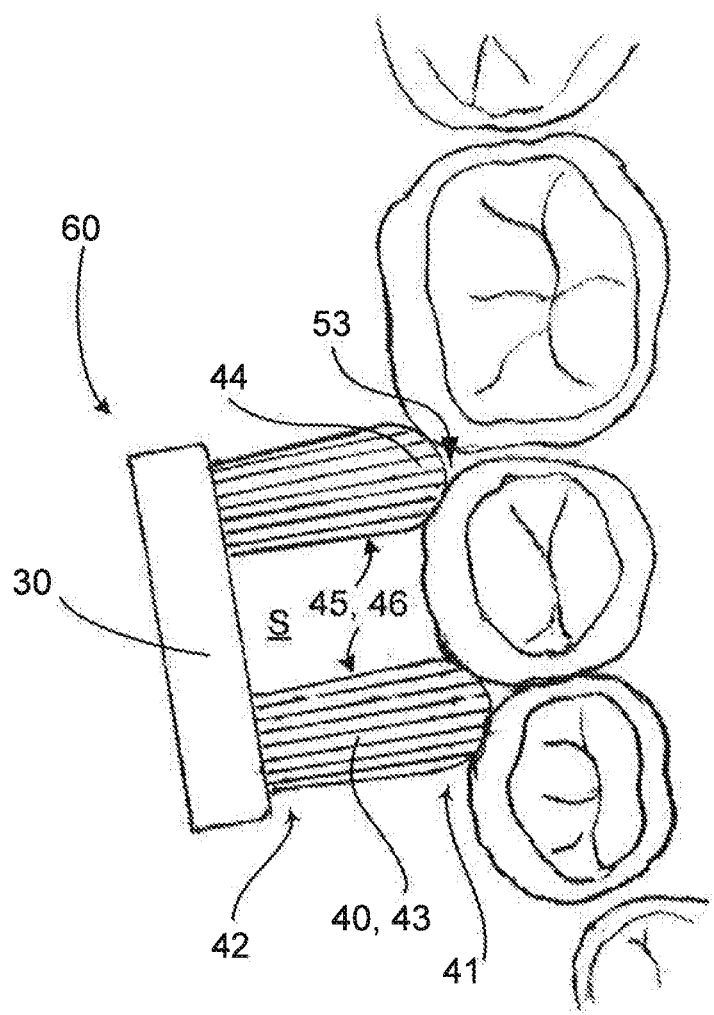
FIG. 7 is a top view of teeth showing the invention during brushing.
Figure 8A:
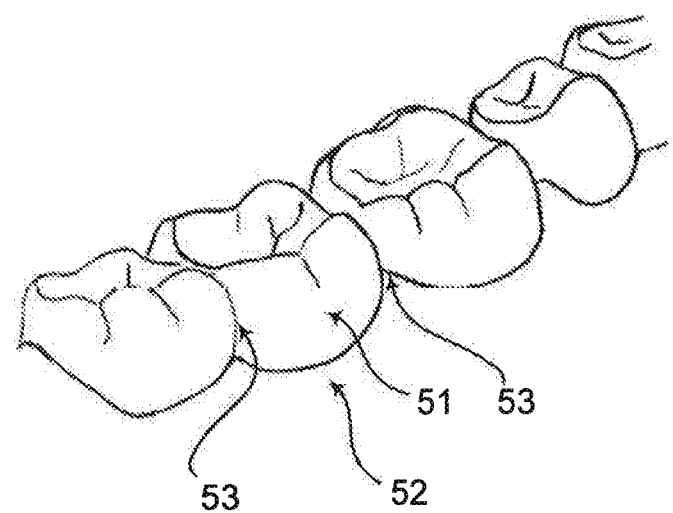
FIGS. 8A-B are perspective views of teeth with areas for brushing by means the invention.
Figure 8B:
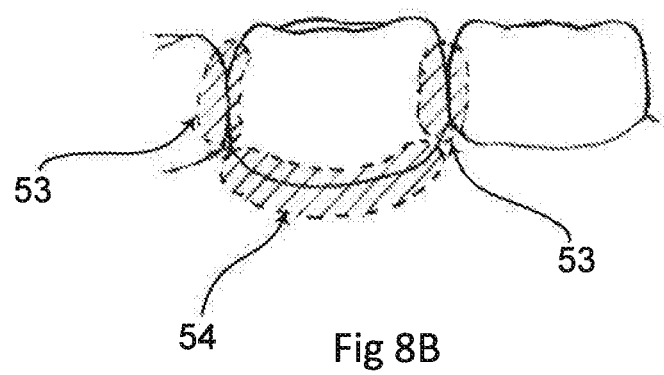

The method comprises the arranging of a tooth or part of a tooth in the tooth receiving space S followed by oscillation of the tuft plate 30 by means of the power generated from handle 2 and/or the brush head 10 such that the tufts 40 conduct a sweep. Due to the described arrangement of tufts on the tuft plate, the brush head has the advantage that the tuft ends 41 will reach in the area 53 between the teeth/a space or area where two teeth are adjacent each other 53 and/or around a corner of a tooth and/or also along the bottom area of teeth along the length of the bottom/neck area of the teeth 54 adjacent the gum 52 as shown in FIGS. 7 and 8A-B. The described arrangement of the tufts 40 further has the effect that the centre area of the tuft is devoid of tufts due to the space S and thereby does not conduct excess abrasion on the main surfaces/face 51 of the crown/tooth of the teeth when a tooth is arranged at and/or in the centre of the tuft plate 30 with the main surface/face of the tooth arranged in the space S (this inventive receiving of a tooth between the tufts of the tuft plate is also clearly seen in FIG. 4 by the interface 50 being partly "sunk in" or introduced into the cavity S enabling the inventive further reach and improved cleaning of interdental spaces 53). The areas 51, 52, 53, 54 of the teeth and mouth, i.e. the gum 52, the interdental area 53 and the face of the tooth 51 are shown in FIGS. 8A-B.

Before use, all tufts 40 have corresponding or same shape, in particular at their free ends 41 as their ends 42 fixedly attached to the tuft plate 30 do not change shape due to the contact and brushing against teeth over time. The free ends change shape over time in response to their use, i.e. the free ends 41 have the same shape before use but change shape during use, i.e. brushing and splay/straggle more the longer the use is. The free ends 41 have at least to some extent differing shapes in relation to the original shape after a certain time of use but also in relation to each other before the brush head 10 is worn out and exchanged to one with fresh tufts 40 of corresponding/same shape. The diameter range of about 3-4 mm is measured at the attached end 42. The diameter of each tuft 40 increases somewhat towards its free end 41 and may vary for fresh, i.e. not used tufts. At the first use, the free end 41 widens or splay, whereby the diameter closer to the free end is increased, considerably more at the distal end 41 compared to more proximal positions and also the fixed end 42. Hence, the diameter and splaying of the free tuft end 41 increases gradually during use until the free tuft end 41 has "flowered"/straggled/splayed out too much and is considered "used up" and the brush head 10 is to be exchanged. Moreover, technically, a tuft 40 is in principle cylindrical along its whole length when manufactured, i.e. just after being taken out of the production tool but widens/dilates in (after) a while (without being used/before use).

| Nomenclature |
| --- |
| 1. Electric toothbrush |
| 2. Handle |
| 10. Brush head |
| 20. Brush head shaft |
| 21. Brush head upper/free end |
| 22. Brush head lower end |
| 30. Tuft plate |
| 31. Periphery of tuft plate |
| 32. Centre axis/axle of tuft plate |
| 40. Tuft or tufts |
| 40A. Prior art tuft |
| 41. Tuft free end |
| 42. Tuft attached end |
| 43. Mono filament/-s |
| 44. Protruding zone |
| 45. Supporting zone |
| 46. Mono filament mantle surface |
| 47. Mono filament tip |
| 48. Teeth brushing surface |
| 49. Centre axis of tuft |
| 50. Interface |
| 51. Face of the tooth/outer surface of the crown of the tooth |
| 52. Gum |
| 53. Area/Surface between teeth/Interdental area |
| 54. Bottom/neck area of teeth |
| 60. Brush assembly |
| F. Longer mono filament/-s of protruding zone |
| f. Shorter mono filament/-s of supporting zone |
| L. Maximum free length of mono filaments |
| l. Minimum free length of mono filaments |

-continued

Nomenclature

L'. Maximum/Total length of mono filaments
α. Arc angle of centre of tuft
Σα. Sum of arc angles of centre of tufts 40
β. Arc angle of tuft 40
Σβ. Sum of arc angles of tufts 40
d. Distance between inner periphery of tuft 40 and centre axle/axis 32 of tuft plate 30
D. Distance between centre axle/axis 49 of tuft 40 and centre axle/axis 32 of tuft plate 30
S. Teeth/tooth and/or tooth paste receiving space in centre of tuft plate 30

The invention claimed is:

1. A brush head for an electric toothbrush comprising:
a brush head shaft with two ends, one end configured to detachably connect to a handle of the electric toothbrush;
an oscillatable tuft plate connected to the other end of the brush head; and
exactly four tufts, each tuft non-rotatably attached to the tuft plate and protruding perpendicularly from the tuft plate, wherein each tuft comprises a free end and an end fixedly attached to the tuft plate, wherein each tuft of the tufts comprises mono filaments of varying length, wherein the varying lengths of the mono filaments form a teeth brushing surface of each tuft having a rotationally symmetrical cambered rounded outline, and wherein each tuft has a diameter in the range of about 3-4 mm; and
wherein each tuft is positioned at a radial distance from the centre axis of the tuft plate so that the tufts, in oscillation, collectively form a hemispheric-shaped bushing interface that includes a cavity devoid of tufts located at the centre axis of the tuft plate, the cavity devoid of tufts being shaped and sized to receive a tooth so that a center of the brushing interface is contactless and non-abrasive with the received tooth.

2. The brush head according to claim 1, wherein the tufts are arranged equidistant to each other along a periphery of the tuft plate.

3. The brush head according to claim 1, wherein the radial distance is selected from one of between 2-8 mm, between 3.5-6.5 mm, and between 2-4 mm from the centre axis of the tuft plate.

4. The brush head according to claim 1, wherein the cavity devoid of tufts further defines a tooth paste dispensing volume that has a size characteristic selected from one of an area in a plane parallel to the tuft plate of about 20-60 mm², constitutes about 15-40% of the surface area of the tuft plate, and constitute about 15-30% of the surface area of the tuft plate.

5. The brush head according to claim 1, wherein the varying length of the mono filaments is configured to create a teeth brushing surface of the free tuft end comprising a protruding zone of filaments with increasing lengths towards the centre of the tuft.

6. The brush head according to claim 5, wherein the varying length of the mono filaments creates a teeth brushing surface of the free tuft end comprising a supporting zone of shorter filaments encircling a protruding zone of longer filaments.

7. The brush head according to claim 1, wherein the varying length of the mono filaments is configured to create a teeth brushing surface of the free tuft end comprising a supporting zone of filaments with decreasing lengths towards the periphery of the tuft.

8. The brush head according to claim 1, wherein the ratio of length between longest and shortest of the mono filaments is selected from one of about 60-90%, about 75-85%, and about 80%.

9. The brush head according to claim 1, wherein each mono filament has a thickness selected from one of less than about 0.13 mm, less than about 0.11 mm, and between about 0.102 mm and 0.076 mm.

10. The brush head according to claim 1, wherein the varying length of the mono filaments increases a number of tips of the mono filaments at the free end of each tuft contacting a tooth in a bent state relative to a tuft without the varying length.

11. An electric toothbrush comprising the brush head according to claim 1 and a handle that detachably connects to the brush head.

12. The electric toothbrush according to claim 11, wherein the radial distance is selected from one of about 2-8 mm, about 3.5-6.5 mm, about 2-4 mm, and at least 2.5 mm from the centre axis of the tuft plate.

13. The electric toothbrush according to claim 11, wherein oscillation of the tuft plate about its centre axis includes making an angular sweep having an arc length corresponding to an arc angle of at least 45-90 degrees relative the centre axis, such that the arc angles of all the tufts equal a sum of a minimum 230-270 degrees and up to a maximum of 360-450 degrees for every half period of the oscillation.

14. The brush head according to claim 1, wherein oscillation of the tuft plate about its centre axis includes making an angular sweep having an arc length corresponding to an arc angle of at least 45-90 degrees relative the centre axis, such that the arc angles of all the tufts equal a sum of a minimum 230-270 degrees and up to a maximum of 360-450 degrees for every half period of the oscillation.

* * * * *